US010202722B2

(12) United States Patent
Mashburn et al.

(10) Patent No.: US 10,202,722 B2
(45) Date of Patent: Feb. 12, 2019

(54) METHOD OF APPLYING A THEROMPLASTIC POLYMER COATING

(71) Applicants: Larry E Mashburn, Dalton, GA (US); Giuseppe V Tambasco, Marietta, GA (US)

(72) Inventors: Larry E Mashburn, Dalton, GA (US); Giuseppe V Tambasco, Marietta, GA (US)

(*) Notice: Subject to any disclaimer, the term of this patent is extended or adjusted under 35 U.S.C. 154(b) by 154 days.

(21) Appl. No.: 15/340,616

(22) Filed: Nov. 1, 2016

(65) Prior Publication Data
US 2018/0119339 A1 May 3, 2018

(51) Int. Cl.
*D06N 7/00* (2006.01)
*B32B 37/12* (2006.01)

(52) U.S. Cl.
CPC ......... *D06N 7/0073* (2013.01); *D06N 7/0076* (2013.01); *D06N 7/0081* (2013.01); *B32B 2037/1238* (2013.01); *B32B 2037/1276* (2013.01); *B32B 2471/02* (2013.01); *D06N 2205/023* (2013.01); *D06N 2205/045* (2013.01);
(Continued)

(58) Field of Classification Search
CPC .. D06N 7/0036; D06N 7/0073; D06N 7/0076; D06N 7/0081; D06N 2205/023; D06N 2205/04; D06N 2205/045; D06N 2205/10; D06N 2205/106; D06N 2207/123; B32B 37/1284; B32B 2037/1238; B32B 2037/1276; B32B 38/164; B32B 2038/166; B32B 2310/0825; B32B 2471/02
See application file for complete search history.

(56) References Cited

U.S. PATENT DOCUMENTS 4,205,112 A 5/1980 Mervin
4,808,459 A 2/1989 Smith et al.
(Continued)

FOREIGN PATENT DOCUMENTS

EP 1231247 A1 8/2002
JP 6322664 11/1994
(Continued)

OTHER PUBLICATIONS

European Search Report, Application No. 17189588.1 dated Nov. 17, 2017.
(Continued)

*Primary Examiner* — Michael A Tolin
(74) *Attorney, Agent, or Firm* — Robert E. Richards; Richards IP Law

(57) ABSTRACT

The invention comprises a method. The method comprises applying a quantity of an aqueous dispersion of thermoplastic polymer particles to a primary backing and loop backs of a tufted carpet or a tufted synthetic turf, wherein the thermoplastic particles have an average particle size less than 1,000 microns. The method also comprises heating the aqueous dispersion to a temperature sufficient to remove water therefrom, and heating the thermoplastic particles on the primary backing and loop backs to a temperature at or above the melting temperature of the thermoplastic particles. The method further comprises allowing the heated thermoplastic polymer particles to cool below their melting temperature whereby the loop backs are adhered to the primary backing.

19 Claims, 2 Drawing Sheets

(52) U.S. Cl.
CPC ... *D06N 2205/10* (2013.01); *D06N 2205/106* (2013.01)

(56) References Cited

U.S. PATENT DOCUMENTS

| | | | |
|---|---|---|---|
| 4,836,871 | A | 6/1989 | Kato |
| 5,856,376 | A | 1/1999 | Wong |
| 5,902,663 | A | 5/1999 | Justesen et al. |
| 5,962,564 | A | 10/1999 | Braud et al. |
| 6,383,586 | B1 | 5/2002 | Langland |
| 6,475,619 | B2 | 11/2002 | Goldberg |
| 6,521,696 | B2 | 2/2003 | Dates et al. |
| 6,673,432 | B2 | 1/2004 | Kiik et al. |
| 6,743,741 | B1 | 6/2004 | Araki et al. |
| 6,808,786 | B2 | 10/2004 | Theiss |
| 7,018,492 | B1 | 3/2006 | Mumm et al. |
| 7,081,498 | B2 | 8/2006 | Moeller et al. |
| 7,267,870 | B2 | 9/2007 | Matsumoto et al. |
| 7,335,423 | B2 | 2/2008 | Huber |
| 7,348,048 | B2 | 3/2008 | Rabasco et al. |
| 7,357,971 | B2 | 4/2008 | Bieser et al. |
| 7,645,829 | B2 | 1/2010 | Tse et al. |
| 7,816,003 | B1 | 10/2010 | Luchio |
| 7,820,728 | B2 * | 10/2010 | Wright ............... B29B 17/02 139/2 |
| 7,910,194 | B2 | 3/2011 | Bieser et al. |
| 8,283,017 | B2 | 10/2012 | Bieser et al. |
| 8,496,769 | B2 | 7/2013 | Brumbelow et al. |
| 9,051,683 | B2 | 6/2015 | Brumbelow et al. |
| 9,376,769 | B2 | 6/2016 | Bieser et al. |
| 2001/0046581 | A1 | 11/2001 | Brumbelow et al. |
| 2002/0134486 | A1 | 9/2002 | Brumbelow et al. |
| 2004/0043184 | A1 | 3/2004 | Kobayashi et al. |
| 2004/0258874 | A1 | 12/2004 | Desai |
| 2005/0281977 | A1 | 12/2005 | Mashbum |
| 2007/0071988 | A1 | 3/2007 | Botros |
| 2007/0082172 | A1 | 4/2007 | Derbyshire et al. |
| 2007/0254130 | A1 | 11/2007 | Cheek |
| 2007/0259163 | A1 | 11/2007 | Connolly et al. |
| 2007/0270064 | A1 | 11/2007 | Aseere |
| 2008/0274307 | A1 | 11/2008 | Chereau et al. |
| 2009/0022936 | A1 | 1/2009 | McGill |
| 2010/0137493 | A1 | 6/2010 | Tilton |
| 2010/0247814 | A1 | 9/2010 | Nisikawa et al. |
| 2010/0310813 | A1 | 12/2010 | McGill |
| 2011/0097535 | A1 * | 4/2011 | Bergman ............... C08K 5/06 428/95 |
| 2013/0206630 | A1 | 8/2013 | Burmeister |
| 2013/0261238 | A1 | 10/2013 | Arango |
| 2013/0344281 | A1 | 12/2013 | Wright et al. |
| 2014/0349060 | A1 | 11/2014 | Mueller et al. |
| 2015/0086746 | A1 | 3/2015 | B.R. de Castro et al. |
| 2016/0201239 | A1 | 8/2016 | Baer et al. |
| 2016/0298003 | A1 | 10/2016 | Alsoryai |
| 2017/0166771 | A1 | 6/2017 | Hall, Jr. |

FOREIGN PATENT DOCUMENTS

| | | |
|---|---|---|
| JP | 2008099805 | 10/2006 |
| WO | 9506771 A1 | 3/1995 |
| WO | 9940250 A2 | 8/1999 |
| WO | 0132976 A1 | 5/2001 |
| WO | 0140561 A2 | 6/2001 |
| WO | 2004035910 A1 | 4/2004 |
| WO | 2006032433 A1 | 3/2006 |
| WO | 2008124449 A2 | 10/2008 |
| WO | 2013093547 A1 | 6/2013 |

OTHER PUBLICATIONS

European Search Report, Application No. 17189839.8 dated Mar. 7, 2018.
Machine translation of JP 5148751.
Machine translation of JP 6322664.
Machine translation of JP 6059176.
U.S. Appl. No. 15/469,637, filed Mar. 27, 2017.
U.S. Appl. No. 15/608,334, filed May 30, 2017.
English Abstract of JP 20899805.

* cited by examiner

METHOD OF APPLYING A THEROMPLASTIC POLYMER COATING

FIELD OF THE INVENTION

The present invention generally relates to a method of applying a thermoplastic polymer coating to a fabric. More particularly, the present invention relates to a method for securing tufted yarns or filaments in a primary backing. The present invention also related to the lamination of fabrics. More particularly, the present invention relates to a method of laminating fabrics using an aqueous dispersion of thermoplastic polymer particles. Specifically, the present invention relates to a method of attaching a secondary backing material to a primary backing material of a carpet or synthetic turf using an aqueous dispersion of thermoplastic polymer particles.

BACKGROUND OF THE INVENTION

Carpets are typically constructed from a primary backing material and a face pile formed on one side. Face pile can be form in the primary backing by tufting or by adhesively attaching a face pile to the primary backing. Currently, the majority of carpet being manufactured in the U.S. is made by a tufting process. The tufting process forms looped or cut pile on one side of a primary backing and loop backs on the opposite side by a process well known in the art. The primary backing can be made from a woven or nonwoven fabric of natural or synthetic materials. Synthetic turf is also made by tufting synthetic filaments into a synthetic primary backing.

After the primary backing is tufted, an adhesive precoat may be applied to lock the tufts in the primary backing. Then, a secondary backing may optionally be adhesively attached by applying a coating of adhesive on the side of the primary backing opposite the face pile, contacting the adhesive with the secondary backing and allowing the adhesive to cool or cure.

An adhesive frequently used as an adhesive pre-coat or for attaching a secondary backing to a primary backing is polyurethane. However, polyurethane generally is not recyclable. To solve the problem of non-recyclability, thermoplastic adhesives have been used. However, attaching a secondary backing to a primary backing with a hot melt thermoplastic adhesive generally requires relatively large amount of adhesive. This relatively large amount of adhesive contributes to the overall cost of the finished product.

It would be desirable to be able to attach a secondary backing to a primary backing of a carpet or synthetic turf using an adhesive system that requires the use of relatively smaller amounts of adhesive. It would also be desirable to be able to attach a secondary backing to a primary backing of a carpet or synthetic turf using reduced amounts of adhesive without sacrificing desired physical properties of the finished product.

SUMMARY OF THE INVENTION

The present invention satisfies the foregoing needs by providing an improved adhesive system for carpet and synthetic turf.

In one disclosed embodiment, the present invention comprises a method. The method comprises applying a quantity of an aqueous dispersion of thermoplastic polymer particles to a primary backing and loop backs of a tufted carpet or a tufted synthetic turf, wherein the thermoplastic particles have an average particle size less than 1,000 microns. The method also comprises heating the aqueous dispersion to a temperature sufficient to remove water therefrom, and heating the thermoplastic particles on the primary backing and loop backs to a temperature at or above the melting temperature of the thermoplastic particles. The method further comprises allowing the heated thermoplastic polymer particles to cool below their melting temperature whereby the loop backs are adhered to the primary backing.

In another disclosed embodiment, the present invention comprises a method. The method comprises preparing a foam of an aqueous dispersion of thermoplastic polymer particles, wherein the thermoplastic polymer particles have a particle size of approximately 10 microns to approximately 200 microns and applying a quantity of the foamed aqueous dispersion to a primary backing and loop backs of a tufted carpet or tufted synthetic turf. The method also comprises heating the aqueous dispersion on the primary backing and loop backs to a temperature sufficient to remove water therefrom and heating the thermoplastic particles on the primary backing and loop backs to a temperature at or above their melting temperature. The method further comprises cooling the heated thermoplastic polymer particles to below their melting temperature whereby the loop backs are adhered to the primary backing.

In another disclosed embodiment, the present invention comprises a method. The method comprises applying a quantity of an aqueous dispersion of thermoplastic polymer particles to a primary backing and loop backs of a tufted carpet or a tufted synthetic turf, wherein the thermoplastic particles have an average particle size less than 1,000 microns and heating the aqueous dispersion to a temperature sufficient to remove water therefrom. The method also comprises heating the thermoplastic particles on the primary backing and loop backs to a temperature at or above the melting temperature of the thermoplastic particles and placing a secondary backing in contact with the heated thermoplastic polymer particles on the primary backing. The method further comprises allowing the heated thermoplastic polymer particles to cool below their melting temperature whereby the primary and secondary backings are adhered together.

Accordingly, it is an object of the present invention to provide an improved carpet and synthetic turf adhesive system.

Another object of the present invention is to provide a carpet and synthetic turf adhesive system that requires the use relatively smaller amounts of adhesive.

A further object of the present invention is to provide a carpet and synthetic turf adhesive system that does not sacrifice desired physical properties of the finished product.

Another object of the present invention is to provide an adhesive system for carpet and synthetic turf that utilizes an aqueous dispersion of thermoplastic particles.

Yet another object of the present invention is to provide an improved adhesive system for attaching a secondary backing to a primary backing of a carpet or synthetic turf.

A further object of the present invention is to provide an improved adhesive system for securing tuft loop backs to a primary backing of a tufted carper or a tufted synthetic turf.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
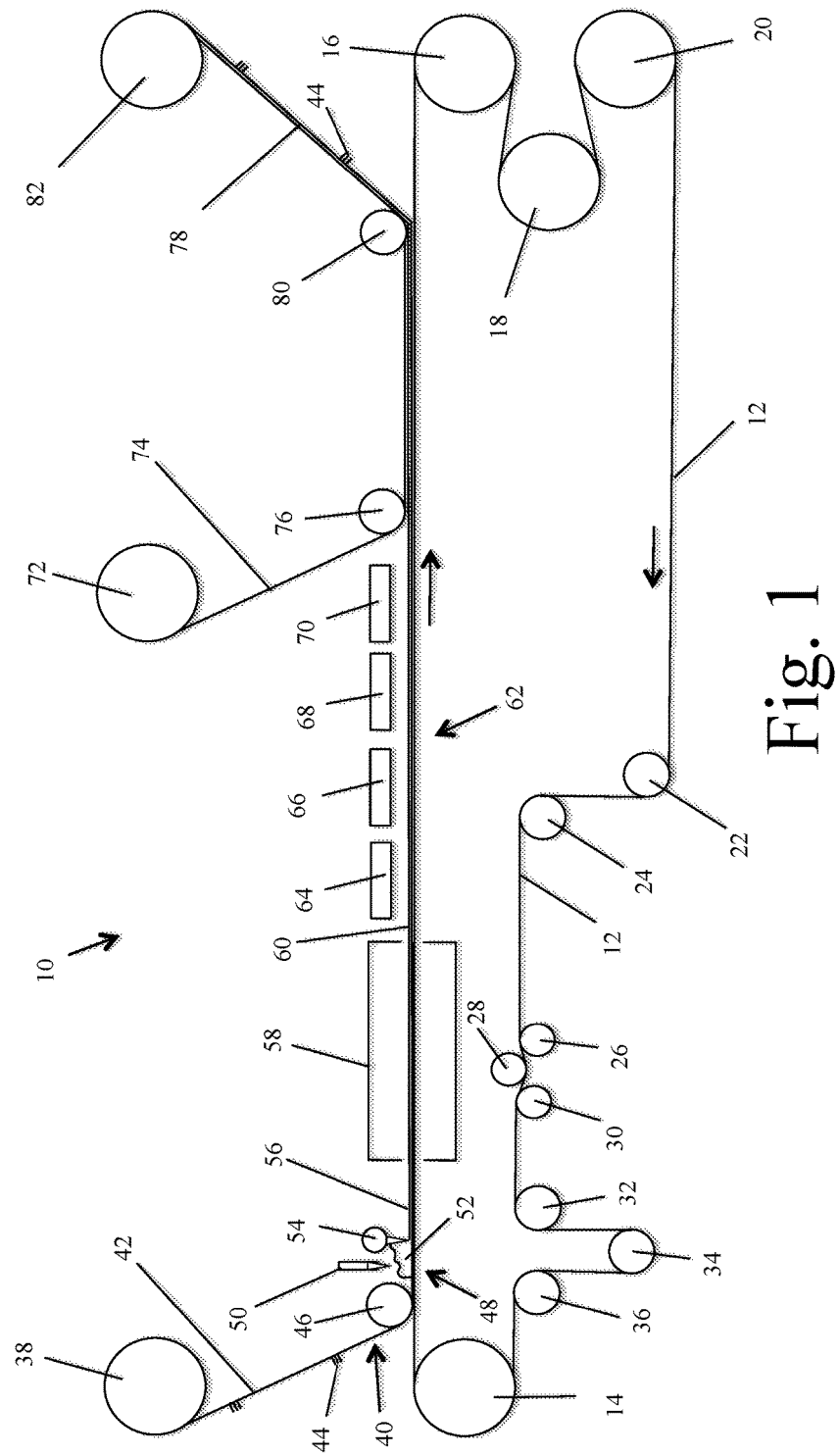
FIG. 1 is a schematic view of a disclosed embodiment of an apparatus for preparing carpet or synthetic turf using the adhesive system of the present invention.

Referring now to the drawing in which like numbers indicate like elements throughout the several views, there is shown in FIG. 1 a disclosed embodiment of an apparatus 10 for attaching a secondary backing material to a primary backing material of a carpet or synthetic turf in accordance with the present invention. The apparatus 10 comprises an endless conveyor belt 12 extending along and endless conveyor path over four drive rollers 14, 16, 18 and 20, which are driven by an electric motor (not shown), idler rollers 22, 24, belt guide rollers 26, 28, 30 and belt tensioner rollers 32, 34 and 36. The speed of the belt 12 is variably controllable to adjust to varying manufacturing needs.

From the drive roller 14, the conveyor belt 12, which preferably is constructed from Teflon coated fiberglass, is seen to pass around the drive rollers 16, 18, 20. The belt 12 is delivered to the idler rollers 22, 24, to the belt guide rollers 26, 28, 30, the belt tensioner 32, 34, 36 and then back to the drive roller 14.

Figure 2:
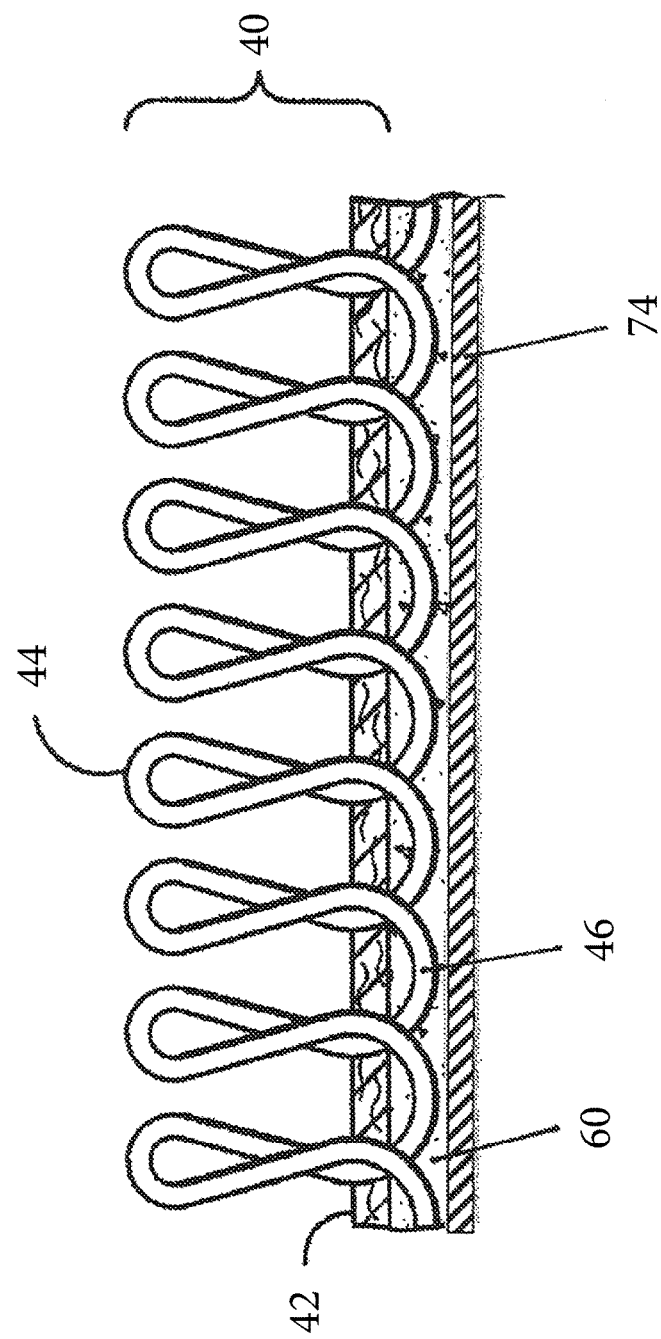
FIG. 2 is a cross-sectional side view of a tufted carpet.

Positioned above the belt 12 adjacent the drive roller 14 is a supply roll 38 of tufted greige goods 40 (FIG. 2). The tufted greige goods 40 comprise a primary backing material 42 and tufted yarns that form a face pile 44 on one side of the primary backing material and loop backs 46 on the other side of the primary backing material. The face pile 44 is shown in the disclosed embodiment as looped pile. However, the face pile useful in the present invention can also be cut pile, or in the case of synthetic turf, individual filaments. In addition, the primary backing material 42 is shown as being tufted. However, face pile useful in the present invention can also be formed on one side of the primary backing material 42 in any way known in the art. The primary backing material 42 can be woven or nonwoven. Both the face pile 44 and the primary backing material 42 can be made from natural or synthetic materials. Furthermore, the face pile 44 and primary backing material 42 can be made from the same material or different materials. However, it is particularly preferred that the face pile 44 and the primary backing material 42 both be made from thermoplastic material. Suitable thermoplastic materials for the face pile 44 and primary backing material 42 include, but are not limited to, nylon, including polyadipamide, polycaprolactam, copolymers, and blends thereof; polyolefin, including polyethylene, polypropylene, copolymers and blends thereof; thermoplastic polyester, including polytrimethyleneterephthlate and polyethyleneterephthalate, and blends thereof; acrylics, including polyacrylonitrile; co-polymers and blends thereof.

The tufted greige goods 40 is fed from the supply roll 38, around a roller 46 and onto the belt 12 where it lays flat on the surface of the belt and moves in unison with the belt. As can be seen in FIG. 1, the tufted greige goods 40 is positioned so that the face pile 44 extends downwardly from the primary backing material 42 so that the face pile is adjacent to and contacts the belt 12 and the primary backing material faces upward. The tufted greige goods 40 on the belt 12 moves from the roller 46 to a polymer deposition station 48. The polymer deposition station 48 includes a traversing downwardly extending spout 50 disposed above the tufted greige goods 40 on the belt 12. An aqueous dispersion of thermoplastic polymer particles is delivered into a mixer/frothing machine (not shown) where the aqueous dispersion is made into a frothed foam. While the present invention has been disclosed as preparing a foam using a frothing machine, it is specifically contemplated that a foam of the aqueous dispersion of thermoplastic polymer particles can be prepared by any method known in the art, including incorporating a blowing agent in the aqueous dispersion composition. The aqueous dispersion foam is transferred from the mixer/frothing machine through a flexible hose (not shown) to the spout 50. The spout 50 traverses back and forth across the width of the tufted greige goods 40 on the belt 12 and polymer foam is dispensed from the spout onto the primary backing material 42. The aqueous dispersion foam forms a puddle 52 on the upper surface of the primary backing material 42. As the aqueous dispersion foam-bearing tufted greige goods 40 moves with the belt 12, it passes under a doctor bar 54 which transforms the puddle of aqueous dispersion foam 52 into a layer 56 of uniform thickness across the width of the primary backing material 42 of the tufted greige goods 40. The doctor bar 54 is set to a height so that the foam puddle 52 is transformed into a layer 56 of a thickness so that sufficient thermoplastic polymer particles are applied to the primary backing material 42 so that sufficient tuft lock is achieved for the loop backs 46 in the primary backing material and sufficient bond strength is provided so that a secondary backing material can be attached to a primary backing material. Preferably, the doctor bar 54 is set to a height so that the foam is formed into a layer of a thickness so that approximately 2 ounces per square yard to approximately 16 ounces per square yard of thermoplastic polymer particles are uniformly applied to the primary backing material 42; more preferably, approximately 4 ounces per square yard to approximately 12 ounces per square yard; more preferably approximately 6 ounces per square yard to approximately 10 ounces per square yard; especially, approximately 8 ounces per square yard.

While the present embodiment has been disclosed as applying an aqueous dispersion foam to the primary backing material 42, it is specifically contemplated that the aqueous dispersion can also be applied to the primary backing material 42 as a liquid dispersion of thermoplastic particles; i.e., in a non-foamed state.

The aqueous dispersion of thermoplastic particles comprises water, thermoplastic particles and a dispersing agent. The aqueous dispersion of thermoplastic particles contains approximately 5% to approximately 90% by weight solids, preferably approximately 30% to approximately 70% by weight solids. The aqueous dispersion of thermoplastic particles preferably comprises approximately 50% to approximately 90% by weight water, approximately 5% to approximately 40% by weight thermoplastic polymer particles and approximately 0.1% to approximately 0.5% by weight dispersion agent. The aqueous dispersion of thermoplastic particles more preferably comprises approximately 60% to approximately 80% by weight water, approximately 20% to approximately 40% by weight thermoplastic polymer particles and approximately 3% to approximately 5% by weight dispersion agent. The aqueous dispersion of thermoplastic particles most preferably comprises approximately 65% to approximately 67% by weight water, approximately 30% by weight thermoplastic polymer particles and approximately 3% to approximately 5% by weight dispersion agent. If the aqueous dispersion of thermoplastic particles is to be made into a foam, the composition can additionally include a foaming agent, preferably approximately 0.5% to approximately 5% by weight foaming agent, more preferably approximately 1% to approximately 2% by weight foaming agent, most preferably approximately 1% by weight foaming agent.

Suitable dispersion agents are those typically used to make aqueous dispersions from solid, non-soluble particles of the sizes set forth above and include, but are not limited to guar gum, agar gum and xanthan gum. Suitable foaming agents are those typically used in the carpet industry and include, but are not limited to, sodium lauryl sulfate and sodium lauryl ether sulfate.

The aqueous dispersion of thermoplastic particles can optionally include one or more of the following additional ingredients: a plasticizer, a thickener, a lubricant, a wetting agent, a colorant, a fire retardant and an inert filler. These additives generally are added to the aqueous dispersion at the rates shown in Table 1 below.

TABLE 1

| Ingredient | % by Weight |
| --- | --- |
| Plasticizers | 3% to 5% |
| Foaming agent | 0.1% to 2% |
| Thickeners | 0.1% to 2% |
| Lubricants | 0.1% to 2% |
| Wetting agents | 0.1% to 2% |
| Colorants | 0.05% to 0.1% |
| Fire retardants | 0.05% to 0.1% |
| Fillers | 10% to 50% |

The thermoplastic polymer particles in the aqueous dispersion are of a particles size such that when mixed with water and a dispersion agent, as specified above, form a stable aqueous dispersion of thermoplastic polymer particles. The thermoplastic polymer particles preferably have an average particles size of less than 1,000 microns, more preferably approximately 1 micron to approximately 1,000 microns, most preferably approximately 10 micron to approximately 1,000 microns, especially approximately 1 micron to approximately 100 microns, more especially approximately 10 microns to approximately 100 microns, most especially approximately 1 micron to approximately 80 microns. The polymer particles can be ground from polymer pellets to the desired particle sizes using methods known in the art including, but not limited to, a pulverizer or a hammer mill.

The thermoplastic polymer particles can be made from any thermoplastic polymer that can be used in carpet or synthetic turf. Preferred thermoplastic polymers include, but are not limited to, nylons, polyethylene, polypropylene, polystyrene, poly(methyl methacrylate), poly(vinyl chloride), poly(vinyl acetate), polycarbonate, polycaprolactone, poly(ethylene oxide), poly(vinyl alcohol), poly(ethylene terephthalate), poly(ether sulphone), poly(butyl terephthalate), poly(ethyl methacrylate), ultrahigh molecular weight polyethylene. Particularly preferred polymers include nylon, including polyadipamide, polycaprolactam, copolymers, and blends thereof; polyolefin, including polyethylene, polypropylene, copolymers and blends thereof; thermoplastic polyester, including polytrimethyleneterephthlate and polyethyleneterephthalate, and blends thereof; acrylics, including polyacrylonitrile; co-polymers and blends thereof. The polymer particles may be amorphous, semi-crystalline or crystalline before they are heated. The process is applicable to single polymers and to mixtures of polymers. For example, the mixture may be of polymers of the same composition but of different molecular weight, or chemically different polymers.

The tufted primary backing material 42 bearing the layer 56 of foam of aqueous dispersion of thermoplastic polymer particles on the belt 12 moves from the polymer deposition station 48 to a heated air oven 58. While the aqueous dispersion of thermoplastic polymer particles is applied to the primary backing material 42 as foam, it is preferred that the foam collapse relatively quickly after it is formed into a layer on the primary backing material. Preferably, the foam of the layer 56 will collapse somewhere between the doctor bar 54 and exiting the oven 58.

The heated air oven 58 is operated at a temperature sufficient to evaporate water from the foam of aqueous dispersion of thermoplastic polymer particles. Preferably, the heated air oven 58 is operated at a temperature sufficient to evaporate water from the foam of aqueous dispersion of thermoplastic polymer particles but below the melting temperature of the thermoplastic polymer particles. More preferably, the heated air oven 58 is operated at a temperature of approximately 212° F. (100° C.). Most preferably, the heated air oven 58 is operated at a temperature of approximately 212° F. to approximately 250° F., especially, approximately 212° F. to approximately 225° F.

The speed of the belt 12, the length of the oven 58 and the temperature of the oven are all designed so that the layer 56 of aqueous dispersion of thermoplastic polymer particles on the primary backing material 42 has a residence time in the oven such that the layer 56 is substantially dry when it leaves the oven. When the water is substantially removed from the aqueous dispersion of thermoplastic polymer particles, the result is a layer 60 of substantially dry thermoplastic polymer particles on the primary backing material 42.

The tufted primary backing material 42 bearing the layer 60 of substantially dry thermoplastic polymer particles moves with the belt 12 from the heated oven 58 to a thermoplastic polymer particle melting station 62. The thermoplastic polymer particle melting station 62 comprises a plurality of infrared heaters 64, 66, 68, 70 disposed above tufted primary backing material 42 bearing the layer 60 of substantially dry thermoplastic polymer particles on the belt 12. The infrared heaters 64-70 are of a strength and are positioned a distance from the primary backing material 42 so that the layer of substantially dry thermoplastic polymer particles on the primary backing material are heated to a temperature higher than when in the heated oven 58. The infrared heaters 64-70 are positioned a distance above the belt 12, the belt is at a speed and the infrared heaters are of a size such that the residence time of the tufted primary backing material 42 bearing the layer 60 of substantially dry thermoplastic polymer particles under the infrared heats is such that the thermoplastic polymer particles are heated to a temperature equal to or higher than the melting point of the thermoplastic polymer particles. Preferably, the layer 60 of substantially dry thermoplastic polymer particles on the tufted primary backing material 42 is heated by the infrared heaters 62-68 to a temperature of approximately 212° F. to approximately 350° F., more preferably, approximately 212° F. to approximately 275° F. The objective of using the infrared heaters 64-70 is to convert the solid thermoplastic polymer particles that make up the substantially dry layer 60 to at least a mesophase between a solid and a liquid, and preferably, to a flowable material or a liquid.

Disposed above the belt 12 is a supply roll 72 of a secondary backing material 74. The secondary backing material 74 feeds from the supply roll 72 under a chilled press roller 76. The chilled roller is a hollow roller into which cold water is circulated. As the tufted primary backing material 42 bearing the melted thermoplastic polymer particles moves from the thermoplastic polymer particle melting station 62 and passes under the chilled press roller 76, the secondary backing material 74 is pressed into intimate contact with the melted thermoplastic polymer particles on the tufted primary backing material 42. The pressure of the chilled press roller 76 on the primary backing material 42 and the secondary backing material 74 causes the melted thermoplastic polymer particles to flow into both the primary backing material and the secondary backing material. Then, the chilled press roller 76 cools the secondary backing material 74, which in turn removes heat from the melted thermoplastic polymer particles and causes them to solidify thereby securely attaching the secondary backing material to the primary backing material 42 and also securely anchoring the loop backs 46 in the primary backing material, which forms a laminated carpet structure 78.

The secondary backing material 74 can be woven or nonwoven. The secondary backing material 74 can be made from natural or synthetic materials. Furthermore, the primary backing material 42 and the secondary backing material 74 can be made from the same material or different materials. However, it is particularly preferred that the face pile 44, the primary backing material 42 and the secondary backing material 74 all be made from thermoplastic polymer materials. Suitable thermoplastic polymer materials for the secondary backing material 74 include, but are not limited to, nylon, including polyadipamide, polycaprolactam, copolymers, and blends thereof; polyolefin, including polyethylene, polypropylene, copolymers and blends thereof; thermoplastic polyester, including polytrimethyleneterephthlate and polyethyleneterephthalate, and blends thereof; acrylics, including polyacrylonitrile; co-polymers and blends thereof.

The laminated carpet structure 78 moves with the belt 12 from the chilled press roller 76 to a stripping roller 80 where the laminated carpet structure is removed from the belt and collected in a take up roll 82.

While the foregoing embodiment of the present invention has been disclosed as being useful for the manufacture of a carpet, it is specifically contemplated that the present invention can be used for the manufacture of synthetic turf. For example, a synthetic turf can be made using the present invention wherein the synthetic turf comprises thermoplastic face yarns, fibers or filaments, such as polyethylene, polypropylene, nylon or combinations thereof and a thermoplastic primary backing. Typically, synthetic turf does not include a secondary backing. However, if it is desired a thermoplastic secondary backing can be attached to the thermoplastic primary backing of a synthetic turf using the present invention. The primary backing can be attached to the secondary backing with thermoplastic polymer particles in accordance with the present invention. This provides a synthetic turf product that is completely recyclable which has been long sought by the industry.

When a secondary backing is not applied to the primary backing of a synthetic turf, the present invention is useful for providing tuft lock to the loop backs of the tufted yarns, fibers or filaments in a primary backing of the synthetic turf. Similarly, the present invention is useful for providing tuft lock to the loop backs of the tufted yarns in a primary backing of a carpet. The present invention can provide tuft lock by practicing the invention as described above with respect to FIG. 1, except the secondary backing 74 is not applied to the primary backing material 42 of the greige goods 40. Thus, when the tufted primary backing material 42 bearing the layer 60 of substantially dry thermoplastic particles passes under the infrared heaters 64-70, they are preferably heated to a flowable or liquid state. This allows the molten thermoplastic material to flow into the interstices of both the primary backing material 42 and the loop backs 46 of the tufted yarns, fibers or filaments that form the face pile. As the tufted primary backing material 42 bearing the melted thermoplastic polymer particles moves from the thermoplastic polymer particle melting station 62 and passes under the chilled press roller 76, molten thermoplastic particles are pressed into intimate contact with the tufted primary backing material 42 and loop backs 46. The pressure of the chilled press roller 76 on the primary backing material 42 and the loop backs 46 causes the melted thermoplastic polymer particles to flow into both the primary backing material and the loop backs. Then, the chilled press roller 76 cools the primary backing material 42 and loop backs 46 which in turn removes heat from the melted thermoplastic polymer particles and causes them to solidify thereby securely anchoring the loop backs in the primary backing material.

Most synthetic turf is made from polyethylene face fiber, which is relatively heat sensitive. When processing synthetic turf that is sensitive to prolonged temperatures above 212° F. (100° C.), the thermoplastic for the polymer particles should be selected so that it melts at a temperature near 212° F. (100° C.), such as at approximately 225° F. This prevents the synthetic turf fibers from being adversely affected while the thermoplastic polymer particles are being melted and mechanically driven into the primary backing material by the chilled press roller. Additionally, the heated air oven 58 can be partitioned so that the lower portion of the oven, in which the face fiber of the synthetic turf is disposed, can be at a lower temperature than the upper portion of the oven, in which the primary backing material 42 bearing the layer 56 of foam of aqueous dispersion of thermoplastic polymer particles is disposed.

On the other hand, carpets are primarily made from nylon or polyester face fiber, which are not as heat sensitive and synthetic turf. Therefore, for carpet the polymer chosen for the thermoplastic polymer particles can have a relatively higher melting point, if needed or desired for specific properties. The higher melting point polymers for the thermoplastic polymer particles provide greater flexibility of increased oven processing temperatures, if desired, which can reduce overall processing time.

As used herein the term "substantially dry" means containing less than 5% by weight moisture.

A particular advantage of the present invention is that the polymers used for the thermoplastic polymer particles in the aqueous dispersion can be regrind polymers, off-specification polymers and recycled polymers. Regarding the use of recycled polymers, it is specifically contemplated that the thermoplastic polymer particles in the aqueous dispersion can be obtained from recycled synthetic turf. In that regard, it is contemplated that the process disclosed in U.S. Pat. No. 8,809,405 (the disclosure of which is incorporated herein by reference in its entirety) can be used to provide thermoplastic polymer pellets for use in the present invention. In addition, a carpet or synthetic turf made in accordance with the present invention employing a thermoplastic face pile, primary backing and secondary backing will be completely recyclable and can be used as feedstock for the process disclosed in U.S. Pat. No. 8,809,405.

Another advantage of the present invention is that the use of a foam of an aqueous dispersion of thermoplastic polymer particles provides a convenient way to uniformly and repeatable deposit relatively small amounts of thermoplastic polymer particles on a primary backing of a carpet or synthetic turf. These relatively small amounts of adhesive provide cost saving in manufacturing costs while not significantly adversely affecting physical properties, especially tuft lock and bond strength between the primary backing and secondary backing.

The following examples are illustrative of selected embodiments of the present invention and are not intended to limit the scope of the invention.

EXAMPLE 1

A tufted carpet product is prepared in accordance with the present invention. The carpet comprises a 0.5 inch pile height polyester face fiber tufted into a woven polypropylene primary backing. An aqueous dispersion of thermoplastic polymer particles is prepared having the following formulation as shown in Table 2:

TABLE 2

| Ingredient | Percent by Weight |
| --- | --- |
| Water | 69.3 |
| Dispersion agent (xanthan gum) | 0.2 |
| Polyethylene particles (having an average particle size of 80 microns) | 30.0 |
| Sodium lauryl sulfate | 0.5 |

The carpet is processed in accordance with the present invention as described above. The aqueous dispersion of Table 2 is converted to a foam in a frothing machine. The foamed aqueous dispersion of thermoplastic polymer particles is applied to the carpet primary backing and formed into a uniform layer at the rate of 10 ounces per square yard and the resulting layer is approximately 0.25 inches thick. The foam coated polypropylene primary backing is heated in a heated oven at a temperature of 212° F. for a period of 4 minutes until the aqueous dispersion is substantially dry. In the heated oven the foam quickly collapses and the substantially dry coating has no remaining foam structure. The thermoplastic polymer particle coated carpet primary backing is then heated at a temperature of 225° F. for a period of 4 minutes until the thermoplastic polymer particles melt. A woven secondary backing made from polypropylene is then applied to the melted thermoplastic polymer particles. The carpet primary backing and secondary backing are run under a chilled press roller so that the primary backing and secondary backing are pressed into intimate contact and the melted thermoplastic polymer particles flow both between the fibers of the woven primary and secondary backings and also into the interstices of the yarns that make up the primary and secondary backings and into the loop backs of the face pile. The chilled press roller removes heat from the molten thermoplastic polymer particles and causes them to solidify. The result is that the secondary backing is securely attached to the primary backing and the carpet face pile yarns are securely locked into the primary backing.

EXAMPLE 2

A synthetic turf product is prepared in accordance with the present invention. The synthetic turf comprises a 2.5 inch pile height polyethylene face fiber tufted into a woven polypropylene primary backing. An aqueous dispersion of thermoplastic polymer particles is prepared having the formulation as shown in Table 2 above.

The synthetic turf is processed in accordance with the present invention as described above. The aqueous dispersion of Table 2 is converted to a foam in a frothing machine. The foamed aqueous dispersion of thermoplastic polymer particles is applied to the synthetic turf polypropylene primary backing and formed into a uniform layer at the rate of 16 ounces per square yard and the resulting layer is approximately 0.25 inches thick. The foam coated polypropylene primary backing is heated in a heated oven at a temperature of 212° F. for a period of 4 minutes until the aqueous dispersion is substantially dry. In the heated oven the foam quickly collapses and the substantially dry coating has no remaining foam structure. The thermoplastic polymer particle coated synthetic turf primary backing is then heated at a temperature of 225° F. for a period of 4 minutes until the thermoplastic polymer particles melt. The synthetic turf primary backing is then run under a chilled press roller so that the melted thermoplastic polymer particles flow between the fibers of the woven primary backing, into the interstices of the yarns that make up the primary backing and at least partially cover the loop backs of the face pile. The chilled press roller removes heat from the molten thermoplastic polymer particles and causes them to solidify. The result is that the loop backs of the face pile are securely attached to the primary backing of the synthetic turf.

EXAMPLE 3

A 2.5 inch pile height polyethylene face fiber synthetic turf with a polypropylene woven primary and a thermoset polyurethane precoat is selected for testing. The synthetic turf is comprised of 51% by weight polyethylene, 14% by weight polypropylene and 35% by weight thermoset polyurethane. The synthetic turf is removed from a sports facility using a Turf Muncher to strip the turf from the field, 95% by weight of the infill material is remove and the turf is rolled into a roll. The turf roll is cut into strips 36 inches wide. The strips are fed into a Series 14 Grinder from Jordon Reduction Solutions of Birmingham, Ala. where the turf strips are ground/cut into particles having a maximum dimension of ⅜ inch. The size reduced synthetic turf is processed through a 4 inch single screw extruder with a 26:1 L/D at 400° F., which is a sufficient temperature to melt the thermoplastic material from which the synthetic turf is made. The extruder is equipped with a 300 horsepower electric motor. The extruder is a Model 6 PM III from NRM Corporation from Columbiana, Ohio. Optionally, 8.6% by weight Westlake GA7502 from Westlake Chemical, which is a maleic anhydride modified methyl acrylate copolymer is added to the molten material during the extrusion process. The extruded molten polymer is pelletized under water using a Gala 6 underwater pelletizer manufactured by Gala Industries, Inc., Eagle Rock, Va.

The thermoplastic polymer pellets are ground to an average particle size of 80 microns by feeding the thermoplastic polymer pellets into a pulverizer. The resulting thermoplastic polymer particles are incorporated into the aqueous dispersion of Table 2 and processed in the same manner as described above in Example 1. The resulting carpet product has excellent physical properties, the secondary backing is securely attached to the primary backing and the loop backs of the face pile yarns are securely locked in the primary backing.

EXAMPLE 4

Aqueous dispersions of thermoplastic particles are prepared according to the formulations listed in Tables 3-8 below as follows:

TABLE 3

| Ingredient | Percent by Weight |
| --- | --- |
| Water | 65.5 |
| 8201 Paste Base (dispersion agent) | 4 |
| 1502 Polypropylene granules (having a particle size of 500-1,000 microns) | 30.0 |
| PS 8300 Thickener | 0.5 |

TABLE 4

| Ingredient | Percent by Weight |
| --- | --- |
| Water | 65.5 |
| 8201 Paste Base (dispersion agent) | 4 |
| 1502 Polypropylene granules (having a particle size of 500-1,000 microns) | 30.0 |
| PS 8300 Thickener | 1 |
| Manwet sodium lauryl sulfate | 2 |

TABLE 5

| Ingredient | Percent by Weight |
| --- | --- |
| Water | 63.25 |
| 8201 Paste Base (dispersion agent) | 4 |
| Ace 2000P low density polyethylene powder (having an average particle size of 0-841 microns) | 30.0 |
| PS 8300 Thickener | 0.75 |
| Manwet sodium lauryl sulfate | 2 |

TABLE 6

| Ingredient | Percent by Weight |
| --- | --- |
| Water | 67.25 |
| N100-20 Polypropylene granules (having an average particle size of 80 microns) | 30.0 |
| PS 8300 Thickener | 0.75 |
| Manwet sodium lauryl sulfate | 2 |

TABLE 7

| Ingredient | Percent by Weight |
| --- | --- |
| Water | 69.3 |
| N100-20 Polypropylene granules (having an average particle size of 80 microns) | 30.0 |
| Xanthan gum | 0.2 |
| Sodium lauryl sulfate | 0.5 |

TABLE 8

| Ingredient | Percent by Weight |
| --- | --- |
| Water | 69.3 |
| N100-20 Polypropylene granules (having an average particle size of 80 microns) | 20.0 |
| Xanthan gum | 0.2 |
| Calcium carbonate | 10 |

The aqueous dispersions of thermoplastic particles prepared according to the formulations of Tables 3-8 above are used to prepare carpets in accordance with Example 1, except the formulations of Tables 3 and 8 are applied to the primary backing as a liquid instead of as a foam. All of the foregoing formulations produce carpets having excellent adhesion of the secondary backing to the primary backing and excellent tuft lock.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method comprising:
    applying a quantity of an aqueous dispersion of thermoplastic polymer particles to a primary backing and loop backs of a tufted carpet or a tufted synthetic turf, wherein the thermoplastic particles have an average particle size less than 1,000 microns;
    heating the aqueous dispersion to a temperature sufficient to remove water therefrom;
    heating the thermoplastic particles on the primary backing and loop backs to a temperature at or above the melting temperature of the thermoplastic particles;
    placing a secondary backing in contact with the heated thermoplastic polymer particles on the primary backing; and
    allowing the heated thermoplastic polymer particles to cool below their melting temperature whereby the primary and secondary backings are adhered together.

2. The method of claim 1, wherein the thermoplastic polymer particles have a particle size of approximately 1 micron to approximately 100 microns.

3. The method of claim 1, wherein the thermoplastic polymer particles have an average particle size of approximately 1 micron to approximately 80 microns.

4. The method of claim 1, wherein the aqueous dispersion comprises:
    approximately 50% to approximately 90% by weight water;
    approximately 1% to approximately 10% by weight dispersion agent; and
    approximately 5% to approximately 40% by weight thermoplastic polymer particles.

5. The method of claim 4, wherein the aqueous dispersion further comprises one or more of a plasticizer, a foaming agent, a thickener, a lubricant, a wetting agent, a colorant, a fire retardant or filler.

6. The method of claim 1, wherein the aqueous dispersion comprises:
    approximately 60% to approximately 80% by weight water;
    approximately 3% to approximately 5% by weight dispersion agent; and
    approximately 20% to approximately 40% by weight thermoplastic polymer particles.

7. The method of claim 1, wherein the aqueous dispersion comprises:
    approximately 65% to approximately 67% by weight water;
    approximately 3% to approximately 5% by weight dispersion agent; and
    approximately 30% by weight thermoplastic polymer particles.

8. The method of claim 1, wherein the step of heating the aqueous dispersion to remove water therefrom comprises heating to a temperature of approximately 150° F. to approximately 350° F.

9. The method of claim 1, wherein the step of heating the aqueous dispersion to remove water therefrom comprises heating to a temperature of approximately 175° F. to approximately 275° F.

10. The method of claim 1, wherein the step of heating the aqueous dispersion to remove water therefrom comprises heating to a temperature of approximately 212° F.

11. The method of claim 1, wherein the thermoplastic polymer particles comprise polypropylene, polyethylene, thermoplastic polyester, polystyrene, polyvinylchloride, thermoplastic polyurethanes, thermoplastic copolymers thereof or mixtures thereof.

12. The method of claim 1, wherein the thermoplastic polymer particles are recycled polymers.

13. The method of claim 1, wherein the aqueous dispersion is applied to the primary backing and the loop backs in the form of a foam.

14. A method comprising:
preparing a foam of an aqueous dispersion of thermoplastic polymer particles, wherein the thermoplastic polymer particles have a particle size of approximately 50 microns to approximately 100 microns;
applying a quantity of the foamed aqueous dispersion to a primary backing and loop backs of a tufted carpet or tufted synthetic turf;
heating the aqueous dispersion on the primary backing and loop backs to a temperature sufficient to remove water therefrom;
heating the thermoplastic particles on the primary backing and loop backs to a temperature at or above their melting temperature;
cooling the heated thermoplastic polymer particles to below their melting temperature whereby the loop backs are adhered to the primary backing; and
applying a secondary backing to the primary backing while the thermoplastic particles are still at or above their melting temperature.

15. The method of claim 14, wherein the step of heating the aqueous dispersion to a temperature sufficient to remove water therefrom comprises heating to a temperature of approximately 212° F. to approximately 350° F.

16. The method of claim 14, wherein the step of heating the aqueous dispersion to a temperature sufficient to remove water therefrom comprises heating to a temperature of approximately 212° F. to approximately 275° F.

17. The method of claim 16, wherein the thermoplastic polymer particles comprise polypropylene, polyethylene, polyester, polystyrene, polyvinylchloride, thermoplastic polyurethanes, thermoplastic copolymers thereof or mixtures thereof.

18. A method comprising:
applying a quantity of an aqueous dispersion of thermoplastic polymer particles to a primary backing and loop backs of a tufted carpet or a tufted synthetic turf, wherein the thermoplastic particles have an average particle size of approximately 1 micron to approximately 1,000 microns;
heating the aqueous dispersion to a temperature sufficient to remove water therefrom;
heating the thermoplastic particles on the primary backing and loop backs to a temperature at or above the melting temperature of the thermoplastic particles;
placing a secondary backing in contact with the heated thermoplastic polymer particles on the primary backing; and
allowing the heated thermoplastic polymer particles to cool below their melting temperature whereby the primary and secondary backings are adhered together.

19. The method of claim 18, wherein the thermoplastic polymer particles have an average particle size of approximately 10 microns to approximately 1,000 microns.

* * * * *